(12) United States Patent
Garois et al.

(10) Patent No.: US 8,648,145 B2
(45) Date of Patent: Feb. 11, 2014

(54) THERMOPLASTIC ELASTOMER VULCANIZATE AND PROCESS FOR PREPARING SAME

(75) Inventors: Nicolas Garois, Amilly (FR); Philippe Sonntag, Hericy (FR); Satha Hong, Montargis (FR); Grégory Martin, Villemandeur (FR); David Galpin, Vimory (FR)

(73) Assignee: Hutchinson, Paris (FR)

( * ) Notice: Subject to any disclaimer, the term of this patent is extended or adjusted under 35 U.S.C. 154(b) by 182 days.

(21) Appl. No.: 13/087,802

(22) Filed: Apr. 15, 2011

(65) Prior Publication Data

US 2011/0281984 A1    Nov. 17, 2011

(30) Foreign Application Priority Data

Apr. 21, 2010 (FR) ...................... 10 01697

(51) Int. Cl.
*C08F 8/00* (2006.01)
(52) U.S. Cl.
USPC ........................................................ 525/101
(58) Field of Classification Search
USPC ........................................................ 525/101
See application file for complete search history.

(56) References Cited

U.S. PATENT DOCUMENTS 6,569,955 B1 * 5/2003 Brewer et al. ............... 525/431

FOREIGN PATENT DOCUMENTS

| WO | WO 03/035759 A1 | 5/2003 |
| WO | WO 03/035764 A1 | 5/2003 |
| WO | WO 2004/023026 A1 | 3/2004 |

OTHER PUBLICATIONS

Search Report for French Application No. FR 10 01 697, dated Jul. 9, 2010.

* cited by examiner

*Primary Examiner* — Margaret Moore
(74) *Attorney, Agent, or Firm* — Alston & Bird LLP

(57) ABSTRACT

The present invention relates to a thermoplastic elastomer vulcanizate having two respectively thermoplastic and liquid silicone elastomer phases, and the preparation process thereof. The invention also provides a elastomer having
  a first phase (A) based on at least one thermoplastic polymer;
  a second phase based on at least one two-component (B1 and B2) liquid silicone elastomer crosslinked by hydrosilylation; and
  a system for compatibilizing these phases that includes:
  at least one polymer (C1) chosen from grafted polyolefins, terpolymers containing poly(vinylaromatic/conjugated diene/methyl methacrylate) blocks, terpolymers containing poly(methyl methacrylate/alkyl acrylate/methyl methacrylate) blocks, ethylene/alkyl(meth)acrylate/acrylic acid terpolymers and polymers resulting from at least one glycidyl ester; and
  a polyorganosiloxane (C2) with SiH functional group(s),
  in order to obtain a homogeneous dispersion of these phases by reactive extrusion with at least the second phase which is continuous therein, according to a particular injection sequence and particular shear and temperature conditions, this blend having improved mechanical properties.

19 Claims, 2 Drawing Sheets

THERMOPLASTIC ELASTOMER VULCANIZATE AND PROCESS FOR PREPARING SAME

FIELD OF THE INVENTION

The present invention relates to a thermoplastic elastomer vulcanizate (TPV) of the type comprising two respectively thermoplastic and liquid silicone elastomer (LSR) phases, and the process for preparing same.

BACKGROUND

Thermoplastic silicone elastomer vulcanizates, also known as TPSiVs, are formed in a known manner by dynamic crosslinking of a silicone phase, for example of two-component liquid type (LSR for liquid silicone rubber) in the presence of a thermoplastic phase. Mention may be made, for example, of documents U.S. Pat. No. 6,013,715, EP-B1-1 440 122 and U.S. Pat. No. 6,569,958 for obtaining such TPSiVs by reactive extrusion, the morphology of which is always such that the thermoplastic phase of the TPSiV is continuous in the blend finally obtained. As regards the silicone phase of each of these TPSiVs, it is usually discontinuous in this blend, being dispersed in this thermoplastic continuous phase, or else as a variant co-continuous with the latter as mentioned in the aforementioned document EP B1 1 440 122.

A major drawback of these TPSiVs known to date lies in the fact that their morphology seemingly never consists of a single continuous liquid silicone phase in which the thermoplastic phase is dispersed, and also in the fact that the fineness and homogeneity of the dispersion obtained of one phase in the other are unsatisfactory. It results therefrom that certain mechanical properties of these TPSiVs leave much to be desired.

SUMMARY

One objective of the present invention is to overcome this drawback, and this objective is achieved in that the Applicant has just discovered, surprisingly, that when a thermoplastic phase, a liquid silicone phase, a specific compatibilizing system and a reinforcing filler are injected into a twin-screw extruder, according to a particular sequence and particular shear and temperature conditions, then a TPV is obtained by reactive extrusion in which at least the silicone phase is continuous and in which the thermoplastic phase may be dispersed therein with a homogeneity and a fineness that are substantially improved relative to the known TPSiVs based on the same thermoplastic polymer(s), which makes it possible to significantly improve their tensile strength, tear strength and compression set and in addition to make these TPVs according to the invention completely suitable for being again processed and converted without adversely affecting their properties.

More specifically, a thermoplastic elastomer vulcanizate according to the invention comprises a first phase based on at least one thermoplastic polymer, a second phase based on at least one liquid silicone elastomer crosslinked by hydrosilylation, and a specific compatibilizing system for compatibilizing these phases together which comprises:

at least one polymer chosen from the group consisting of grafted polyolefins, terpolymers containing poly(vinylaromatic/conjugated diene/methyl methacrylate) blocks, terpolymers containing poly(methyl methacrylate/alkyl acrylate/methyl methacrylate) blocks, ethylene/alkyl(meth)-acrylate/acrylic acid terpolymers and polymers resulting from at least one glycidyl ester such as ethylene/(meth)acrylate/glycidyl(meth)acrylate terpolymers; and a polyorganosiloxane with SiH functional group(s), said elastomer forming a homogeneous dispersion of said first and second phases obtained by reactive extrusion with at least the second phase which is continuous therein.

It will be noted that the Applicant has thus discovered that this compatibilizing system, used within the context of the aforementioned reactive extrusion process makes it possible, via a reduction of the interfacial tension and via an improvement of the adhesion between phases, to satisfactorily overcome the mutual incompatibility of the silicone and thermoplastic phases and therefore to substantially improve the mechanical properties of the TPV obtained, in comparison with the TPSiVs tested in the aforementioned documents U.S. Pat. No. 6,013,715 and EP-B1-1 440 122 which are free of any compatibilizing agent and in document U.S. Pat. No. 6,569,958 which contain a compatibilizing agent of glycidyl ester copolymer type.

As indicated above, this TPV according to the invention advantageously forms a homogeneous blend of these first and second phases, with at least the second phase which is continuous therein. In other words, the first phase may be a discontinuous phase formed of nodules dispersed in the continuous second phase, or else these first and second phases may ultimately be co-continuous in the blend in the form of nodules of one contained in the other and vice versa, these nodules having, in both cases, a mean size of less than 10 μm and preferably of between 50 nm and 5 μm.

Preferably, this TPV comprises the product of the reaction, by this reactive extrusion, of said at least one thermoplastic polymer and of said polyorganosiloxane which is present in excess relative to the stoichiometric proportions of the two components of the liquid silicone and which has said monovalent or polyvalent SiH functional groups at its chain ends or along its chain, this polyorganosiloxane being grafted by this reaction to said at least one thermoplastic polymer.

Also preferably, said polymer included in the compatibilizing system comprises said grafted polyolefin, which may be chosen from the group consisting of homopolymers and copolymers of olefins and copolymers of at least one olefin and of at least one non-olefinic comonomer, and, more preferably still, from the group consisting of homopolymers of an α-olefin, such as polypropylenes, and copolymers of ethylene and of an amide, and preferably, this polyolefin is grafted by maleic anhydride.

As a variant and as indicated previously, said polymer included in the compatibilizing system may be, for example, a terpolymer containing polystyrene/1,4-polybutadiene/polymethyl methacrylate blocks such as that known as SBM, a terpolymer containing polymethyl methacrylate/polybutyl acrylate/methyl methacrylate blocks such as that known as MAM, an ethylene/methyl acrylate/acrylic acid terpolymer such as those known as ATX, or else an ethylene/methyl acrylate/glycidyl methacrylate terpolymer, as non-limiting examples.

Advantageously, a TPV according to the invention may comprise said compatibilizing system in a weight fraction ranging from 1% to 30%, said system may comprise (in parts by weight per 100 parts of thermoplastic polymer(s) and liquid silicone elastomer(s)):

said polymer (such as, for example, said grafted polyolefin) in an amount ranging from 0.1 to 10 parts by weight;

said polyorganosiloxane with SiH functional group(s) in an amount ranging from 0.1 to 2 parts by weight; and optionally a plasticizer, such as a paraffinic oil, a plasticizer of ester or phosphate type or a sulfonamide plasticizer for example, this plasticizer being chosen to be compatible with said first and second phases and being present in an amount ranging from 0 to 20 parts by weight.

It may be noted that these plasticizers of ester or phosphate type are especially suitable in the case where said at least one thermoplastic polymer is a TPU.

Also advantageously, a TPV according to the invention may comprise said at least one thermoplastic polymer in a weight fraction ranging from 20% to 80%, which may be chosen from the group consisting of homopolymers and copolymers of olefins, polyamides, polyimides (PIs), polyphthalamides (PPAs), polyetherimides (PEIs), polyamide-imides (PAIS), thermoplastic elastomers (TPEs) and blends thereof, and preferably from the group consisting of isotactic polypropylenes, copolymers of propylene, high-density polyethylenes, low-density polyethylenes, copolyesters (COPEs), polyether block amides (PEBAs), PA-6 polyamides, PA-4,6 polyamides, PA-6,6 polyamides, PA-11 polyamides, PA 12 polyamides, thermoplastic polyurethanes (TPUs) and blends thereof.

According to another feature of the invention, a TPV according to the invention may comprise, in addition, in a weight fraction ranging from 1% to 30%, a reinforcing filler for reinforcing said first phase and/or said second phase which may be any known compatible filler and which is preferably chosen from the group consisting of inorganic fillers such as hydrophobic pyrogenic silicas, titanium dioxide and talc, organic fillers such as carbon black and graphite, and mixtures thereof.

Advantageously, a TPV according to the invention may comprise said at least one liquid silicone elastomer in a weight fraction ranging from 20% to 80%, which preferably comprises:

a first component comprising a mixture of diorganopolysiloxanes, a reinforcing silica and a platinum-based hydrosilylation catalyst; and a second component comprising a diorganopolysiloxane, an organohydridosilicone compound, a reinforcing silica and an inhibitor.

A process according to the invention for preparing a TPV as defined above comprises a reactive extrusion, carried out by at least one pass of a mixture comprising said first and second phases and said compatibilizing system through a twin-screw extruder.

According to another feature of this process of the invention, introduced into said extruder before said second phase are said first phase; said compatibilizing system, preferably by means of a peristaltic pump; and a reinforcing filler for reinforcing the first and/or second phases.

Preferably, introduced simultaneously into a feed zone of the extruder are:

the first phase;

all or part of said compatibilizing system; and a reinforcing filler for reinforcing the first and/or second phases, in order to obtain a premix that is then reacted optionally with the remaining part of said system, then with the second phase.

According to another feature of this process of the invention, the second phase is mixed with the first phase by injection, into a dispersion zone of the extruder:

of said first component of this second phase; then of said second component of this second phase.

Preferably, the first and second phases are mixed in a dispersion zone of the extruder, at a temperature at least 20° C.

above the melting point of said thermoplastic polymer or the highest melting point of said thermoplastic polymers, and with a shear rate of the blend in this dispersion zone that is greater than 102 s-1 and preferably greater than or equal to 103 s-1.

According to a preferred embodiment of the invention, the blend formed of granules that is obtained at the outlet of said extruder is subjected to a heat treatment, for example for several hours at a temperature between 100° C. and 150° C., to improve the mechanical properties of this blend, such as the tensile strength, tear strength and compression set.

It will be noted that this post-extrusion heat treatment is optional, but makes it possible to avoid a final post-curing step on the finished parts.

In summary and as indicated previously, these granules obtained by the compatibilizing system and by the reactive extrusion process of the invention are characterized by a significant improvement of these properties, in comparison with those of a TPSiV based on the same thermoplastic polymer(s) in which the silicone elastomer forms a discontinuous phase dispersed in this (these) thermoplastic polymer(s).

Furthermore, the TPVs according to the invention thus obtained may advantageously be processed and converted as thermoplastic materials and with the advantages of silicone elastomers, and they are completely suitable for being recycled without significant loss of their properties.

BRIEF DESCRIPTION OF THE DRAWINGS

The aforementioned features of the present invention, and others too, will be better understood on reading the following description of several exemplary embodiments of the invention, given by way of illustration and non-limitingly in connection with the appended drawings, among which.

DETAILED DESCRIPTION

In the following examples, the mixing conditions used for preparing the TPVs according to the invention were the following.

A CLEXTRAL EVOLUM 32 co-rotating twin-screw extruder was used for the reactive mixing, in a single pass, of the two phases of the compatibilizing system and of the reinforcing filler.

Introduced into the extruder were the polyorganosiloxane with SiH groups (of trade name "H-Siloxane"), by means of a peristaltic pump, and the two components B1 and B2 of the (LSR) silicone elastomer via a DOPAG pump. This H-siloxane was introduced in excess relative to the stoichiometric amounts of components B1 and B2.

The residence time of all of the compounds in the extruder was between 1 min and 2 min for all of the tests carried out. As regards the shear rate γ of the blend in this dispersion zone, defined by the formula γ=u/h where u is the linear rotational speed of the screws (in m·s-1) and h the space between these screws (in m), it is always at least equal to $10^3$ $s^{-1}$, which represents very rigorous compounding in comparison with standard shear rates.

Figure 1:
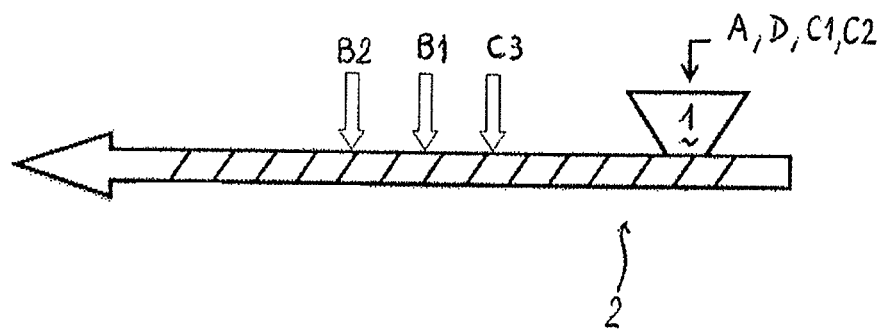
FIG. 1 is a schematic side view of a twin-screw extruder illustrating a sequence for injecting the main ingredients of a TPV according to one preferred method of implementing its preparation process according to the invention.

Carried out, in the first preferred embodiment of the invention, illustrated in FIG. 1, were:

a) firstly, a simultaneous introduction into the feed hopper 1 of the extruder 2 of the thermoplastic phase A, of the reinforcing filler D and of a portion of the compatibilizing system C comprising the grafted polyolefin C1 and the H-siloxane C2 in order to obtain in situ a premix; then b) the introduction into a transport zone of the extruder 2 of the remainder of the compatibilizing system C consisting of a plasticizer C3; then c) the introduction into a dispersion zone of the extruder of the first component B1 of the liquid silicone elastomer phase B (consisting of a mixture of diorganopolysiloxanes, a reinforcing silica and a platinum-based hydrosilylation catalyst), then finally of the second component B2 of this phase B (consisting of a diorganopolysiloxane, an organohydridosilicone compound, a reinforcing silica and an inhibitor).

Figure 2:
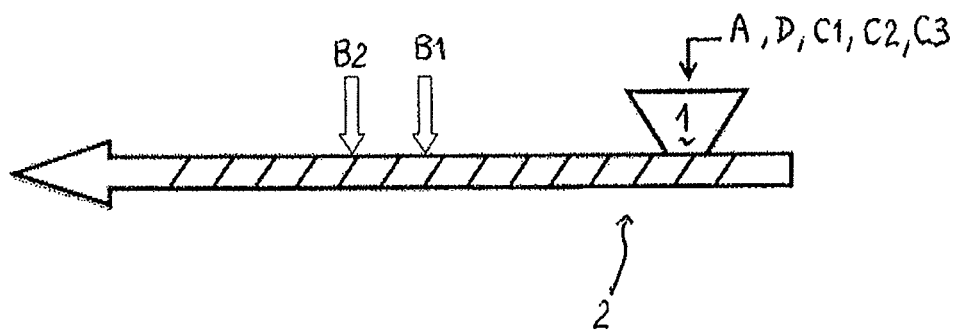
FIG. 2 is a schematic side view of the same extruder illustrating, as a variant of FIG. 1, another possible sequence for injecting the ingredients of a TPV according to the invention.

Carried out in the embodiment from FIG. 2 were:

a) a simultaneous introduction into the feed hopper 1 of the thermoplastic phase A, of the reinforcing filler D and of all of the compatibilizing system C comprising the grafted polyolefin C1, the H-siloxane C2 and the optional plasticizer C3, in order to obtain in situ a premix; then b) the introduction into a dispersion zone of the extruder 2 of the component B1 then of the component B2 of the elastomer phase B.

In these two embodiments, the compounding was carried out at temperatures at least 20 to 30° C. above the melting point of the thermoplastic polymer or of that of the thermoplastic polymers of phase A having the highest melting point, this compounding temperature in the dispersion zone of the extruder being, for example, between 150 and 220° C. and, preferably, between 160 and 200° C. (these temperatures are here given by way of example only in the case where either a polypropylene or a TPU is used as thermoplastic polymer for phase A).

In order to stabilize the thermoplastic vulcanizates obtained, a second pass may optionally be carried out for each blend in the extruder by adding thereto a system of antioxidants, for example of phenol/aromatic amine type.

The following mechanical properties were measured for the "control" thermoplastic vulcanizates and for the thermoplastic vulcanizates according to the invention that were obtained:

Shore A hardness (15 s) and Shore D hardness (3 s);
tensile strength R/R (MPa);
elongation at break A/R (%);
tear strength in DELFT (N/m);
compression set DRC at 25% (22 hours at 100° C.), expressed as %;
E' modulus (MPa) at 20° C. and at 100° C.; and
glass transition temperatures Tg (° C.).

1/Example 1

A first thermoplastic vulcanizate TPV 1 was prepared according to the process of the invention using a polyolefinic phase A containing two polymers and, as a compatibilizing system C between this phase A and phase B, the three aforementioned compounds C1, C2 and C3 introduced according to the first embodiment of FIG. 1. Furthermore, the granules obtained at the outlet of the extruder were subjected to a heat treatment for several hours and at a temperature between 100° C. and 150° C.

TABLE 1

| Ingredients of TPV 1 according to the invention | Parts by weight per 100 parts of thermoplastic polymers and silicone elastomer |
|---|---|
| PPH3060 (polypropylene) | 8.25 |
| Vistamaxx 6202 (ethylene/propylene copolymer) | 19.25 |
| SL 7240 (B1 and B2 two-component LSR) | 70 |
| EXXELOR PO 1020 (maleic anhydride-grafted polypropylene) | 2.5 |
| Primol 352 (plasticizing white oil) | 10 |
| H-siloxane | 1 |
| Aerosil R972 silica | 1 |
| $TiO_2$ | 5 |

The aforementioned properties of this TPV 1 were measured and they were compared in Table 2 below to those of a "5300" TPSiV from Multibase that is polyolefin-based (i.e. that comprises a thermoplastic phase similar to that of this TPV 1).

TABLE 2

|  | TPV 1 invention | TPSiV control "5300" |
|---|---|---|
| Shore A hardness (15 s) | 58 | 59 |
| R/R (MPa) | 6.5 | 4.4 |
| A/R (%) | 235 | 275 |
| DELFT (N/m) | 20.7 | 10.8 |
| DRC at 25% 22 h at 100° C. (%) | 36 | 100 |
| E' modulus (MPa): |  |  |
| at 20° C. | 13 | 24 |
| at 100° C. | 8.5 | 7.5 |
| $T_g$ (° C.) | −36 | −44 |

At substantially equal hardnesses, it is noted that the tensile strength, the DELFT tear strength and the compression set at 100° C. of TPV 1 according to the invention are very substantially greater than the same properties measured on a commercially available TPSiV based on a similar polyolefinic phase.

Figure 3:
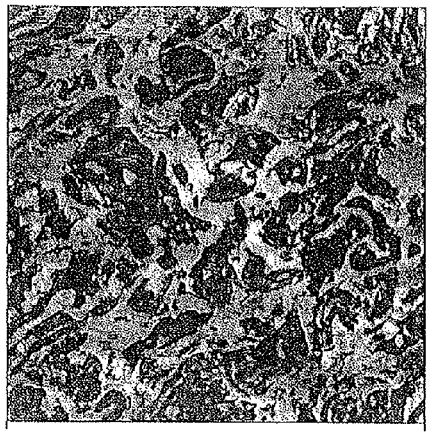
FIG. 3 is an atomic force microscope image illustrating the morphology of a TPV according to a first example of the invention in which the thermoplastic phase is of polyolefin type.
Figure 4:
FIG. 4 is an atomic force microscope image illustrating, as a first "control" example, the morphology of a known TPSiV in which the thermoplastic phase is also polyolefinic.

Indeed, as illustrated in the images from FIGS. 3 and 4, this TPV 1 has a morphology such that the thermoplastic phase A (light) and silicone elastomer phase B (dark) are co-continuous (i.e. with a dispersion in each of the phases A and B of nodules of B and A respectively), and it is seen in FIG. 3 that this dispersion according to the invention is much finer (with mean sizes of nodules between 1 μm and 2 μm approximately), then that which characterizes the two thermoplastic and silicone phases of the "5300" control TPSiV in FIG. 4.

2/Example 2

A second thermoplastic vulcanizate TPV 2 was prepared according to the process of the invention using a polyamide phase A containing a single polymer and, as a compatibilizing system C between this phase A and phase B (unchanged), the three aforementioned compounds C1, C2 and C3 introduced according to the first embodiment of FIG. 1. Furthermore, the granules obtained at the outlet of the extruder were subjected to a heat treatment for several hours at a temperature between 100° C. and 150° C.

TABLE 3

| Ingredients of TPV 2 according to the invention | Parts by weight per 100 parts of thermoplastic polymers and silicone elastomer |
|---|---|
| Akulon F136DH (polyamide PA-6) | 60 |
| SL 7240 (B1 and B2 two-component LSR) | 40 |
| Lotader X-LP21H (maleic anhydride-grafted amide/ethylene copolymer) | 5 |
| Sibercizer PA100 (sulfonamide plasticizer) | 15 |
| H-siloxane | 1 |
| Aerosil R972 silica | 1 |
| $TiO_2$ | 5 |

The aforementioned properties of this TPV 2 were measured and they were compared, in Table 4 below, to those of a "1180" TPSiV from Multibase that is polyamide-based (i.e. that comprises a thermoplastic phase similar to that of this TPV 2).

TABLE 4

|  | TPV 2 invention | TPSiV control "1180" |
|---|---|---|
| Shore D hardness (3 s) | 49 | 44 |
| R/R (MPa) | 26.8 | 21 |
| A/R (%) | 170 | 210 |
| DELFT (N/m) | 59.8 | 48.6 |
| DRC at 25% 22 h at 100° C. (%) | 72 | 73 |
| E' modulus (MPa): |  |  |
| at 20° C. | 220 | 220 |
| at 100° C. | 78 | 41 |
| $T_g$ (° C.) | 14.3 | −35 |
|  |  | 51 |

At equivalent hardnesses, it is noted that the mechanical properties of TPV 2 according to the invention are similar to those measured on this known TPSiV based on a similar polyamide phase, with the exception however of the glass transition temperatures. Indeed, this TPV 2 has only a single $T_g$, characteristic of a well-compatibilized homogeneous mixture, whereas this TPSiV has two very different $T_g$ values, which demonstrates a two-phase mixture and therefore a less effective compatibilization than for TPV 2.

Figure 5:
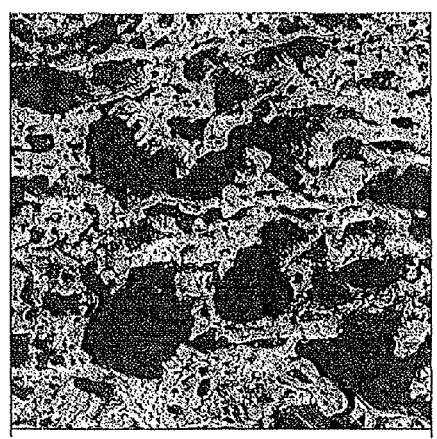
FIG. 5 is an atomic force microscope image illustrating the morphology of a TPV according to a second example of the invention in which the thermoplastic phase is based on a polyamide.
Figure 6:
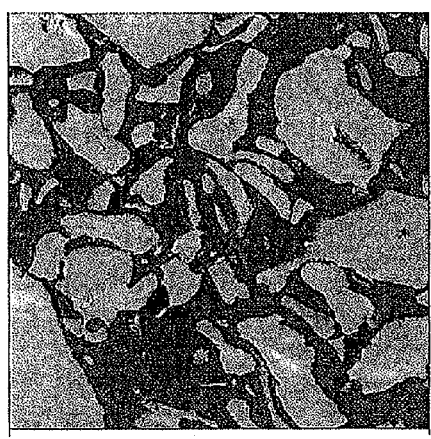
FIG. 6 is an atomic force microscope image illustrating, as a second "control" example, the morphology of a known TPSiV in which the thermoplastic phase is based on such a polyamide.

Indeed, as illustrated in the images from FIGS. 5 and 6, this TPV 2 has a morphology such that the thermoplastic phase A (light) and silicone elastomer phase B (dark) are co-continuous (with the phase A that contains nodules of phase B with a mean size of less than 1 μm), and it can be seen in FIG. 5 that this dispersion is much better than that seen in FIG. 6 for the "1180" control TPSiV, which has its phases A and B that are visibly very separate and not very compatibilized.

The invention claimed is:

1. Thermoplastic elastomer vulcanizate comprising:
   a first phase (A) based on at least one thermoplastic polymer;
   a second phase (B) based on at least one two-component (B1 and B2) liquid silicone elastomer crosslinked by hydrosilylation; and
   a system (C) for compatibilizing these phases together, wherein said system comprises:
   at least one polymer (C1) chosen from the group consisting of grafted polyolefins, terpolymers containing poly(vinylaromatic/conjugated diene/methyl methacrylate) blocks, terpolymers containing poly(methyl methacrylate/alkyl acrylate/methyl methacrylate) blocks, ethylene/alkyl(meth)acrylate/acrylic acid terpolymers and polymers resulting from at least one glycidyl ester such as ethylene/(meth)acrylate/glycidyl (meth)acrylate terpolymers; and
   a polyorganosiloxane (C2) with SiH functional group(s), and in that said elastomer forms a homogeneous dispersion of said first and second phases obtained by reactive extrusion with at least the second phase which is continuous therein.

2. Thermoplastic elastomer vulcanizate according to claim 1, wherein said first phase (A) is a discontinuous phase formed of nodules dispersed in said continuous second phase (B), or else in that the first and second phases are co-continuous in said mixture in the form of nodules of one contained in the other and vice versa, these nodules having, in both cases, a mean size of less than 10 μm and preferably of between 50 nm and 5 μm.

3. Thermoplastic elastomer vulcanizate according to claim 1, wherein the thermoplastic elastomer comprises the product of the reaction, by reactive extrusion, of said at least one thermoplastic polymer and of said polyorganosiloxane (C2) which is present in excess relative to the stoichiometric proportions of said components (B1 and B2) and which has monovalent or polyvalent SiH functional groups at its chain ends or along its chain, this polyorganosiloxane being grafted by this reaction to said at least one thermoplastic polymer.

4. Thermoplastic elastomer vulcanizate according to claim 1, wherein said polymer (C1) included in said system comprises said grafted polyolefin, which is chosen from the group consisting of homopolymers and copolymers of olefins and copolymers of at least one olefin and of at least one non-olefinic comonomer.

5. Thermoplastic elastomer vulcanizate according to claim 1, wherein said polymer (C1) included in said system comprises said grafted polyolefin, which is chosen from the group consisting of homopolymers of an α-olefin and copolymers of ethylene and of an amide, and in that, preferably, said polyolefin is grafted by maleic anhydride.

6. Thermoplastic elastomer vulcanizate according to claim 1, wherein said polymer (C1) included in said system comprises said grafted polyolefin comprising a polyolefin is grafted by maleic anhydride.

7. Thermoplastic elastomer vulcanizate according to claim 1, wherein the thermoplastic elastomer comprises said compatibilizing system (C) in a weight fraction ranging from 1% to 30%, said system comprises (in parts by weight per 100 parts of thermoplastic polymer(s) and liquid silicone elastomer(s)):
   said polymer (C1) in an amount ranging from 0.1 to 10 parts by weight;
   said polyorganosiloxane (C2) with SiH functional group(s) in an amount ranging from 0.1 to 2 parts by weight; and optionally
   a plasticizer (C3) comprising a paraffinic oil, a plasticizer of ester, phosphate or sulfonamide type in an amount ranging from 0 to 20 parts by weight.

8. Thermoplastic elastomer vulcanizate according to claim 1, wherein the thermoplastic elastomer comprises said at least one thermoplastic polymer in a weight fraction ranging from 20% to 80%, which is chosen from the group consisting of homopolymers and copolymers of olefins, polyamides, polyimides (PIs), polyphthalamides (PPAs), polyetherimides (PEIs), polyamide-imides (PAIs), thermoplastic elastomers (TPEs) and blends thereof, and preferably from the group consisting of isotactic polypropylenes, copolymers of propylene, high-density polyethylenes, low-density polyethylenes, copolyesters (COPEs), polyether block amides (PEBAs), PA-6 polyamides, PA-4,6 polyamides, PA-6,6 polyamides, PA-11 polyamides, PA-12 polyamides, thermoplastic polyurethanes (TPUs) and blends thereof.

9. Thermoplastic elastomer vulcanizate according to claim 1, wherein the thermoplastic elastomer comprises said at least one thermoplastic polymer in a weight fraction ranging from 20% to 80%, which is chosen from the group consisting of isotactic polypropylenes, copolymers of propylene, high-density polyethylenes, low-density polyethylenes, copolyesters (COPEs), polyether block amides (PEBAs), PA-6 polyamides, PA-4,6 polyamides, PA-6,6 polyamides, PA-11 polyamides, PA-12 polyamides, thermoplastic polyurethanes (TPUs) and blends thereof.

10. Thermoplastic elastomer vulcanizate according to claim 1, wherein the thermoplastic elastomer comprises, in addition, in a weight fraction ranging from 1% to 30%, a reinforcing filler (D) for reinforcing said first phase (A) and/or said second phase (B) which is chosen from the group consisting of inorganic fillers including hydrophobic pyrogenic silicas, titanium dioxide and talc, and organic fillers including carbon black and graphite, and mixtures thereof.

11. Thermoplastic elastomer vulcanizate according to claim 1, wherein the thermoplastic elastomer comprises said at least one liquid silicone crosslinked by hydrosilylation elastomer (B) in a weight fraction ranging from 20% to 80%, which comprises:
a first component (B1) comprising a mixture of diorganopolysiloxanes, a reinforcing silica and a platinum-based hydrosilylation catalyst; and
a second component (B2) comprising a diorganopolysiloxane, an organohydridosilicone compound, a reinforcing silica and an inhibitor.

12. Thermoplastic elastomer vulcanizate according to claim 2, wherein the thermoplastic elastomer is formed of granules having improved tensile strength, tear strength and compression set in comparison with those of a thermoplastic silicone elastomer vulcanizate (TPSiV) based on the same thermoplastic polymer(s) in which the silicone elastomer forms a discontinuous phase dispersed in this (these) thermoplastic polymer(s).

13. Process for preparing a thermoplastic elastomer vulcanizate according to claim 1, wherein the process comprises a reactive extrusion, carried out by passing a mixture comprising said first and second phases (A and B) and said compatibilizing system (C) through a twin-screw extruder.

14. Process according to claim 13, wherein the process includes the step of introducing into said extruder before said second phase (B) are:
said first phase (A);
said compatibilizing system (C), by means of a peristaltic pump; and
a reinforcing filler (D) for reinforcing said first phase and/or said second phase.

15. Process according to claim 14, wherein the process includes the steps of simultaneously introducing into a first feed zone of said extruder:
said first phase (A);
all or part of said compatibilizing system (C); and
a reinforcing filler (D) for reinforcing said first phase and/or said second phase,
in order to obtain a premix that is then reacted optionally with the remaining part (C3) of said system, then with said second phase (B).

16. Process according to claim 13, wherein said second phase (B) is mixed with said first phase (A) by injection, into a dispersion zone of said extruder:
of a first component (B1) of this second phase comprising a mixture of diorganopolysiloxanes, a reinforcing silica and a platinum-based hydrosilylation catalyst; then
of a second component (B2) of this second phase comprising a diorganopolysiloxane, an organohydridosilicone compound, a reinforcing silica and an inhibitor.

17. Process according to claim 13, wherein said first and second phases (A and B) are mixed in a dispersion zone of said extruder, at a temperature at least 20° C. above the melting point of said thermoplastic polymer or the highest melting point of the thermoplastic polymers, and with a shear rate of the blend in the dispersion zone that is greater than $10^2$ $s^{-1}$.

18. Process according to claim 13, wherein said first and second phases (A and B) are mixed in a dispersion zone of said extruder, at a temperature at least 20° C. above the melting point of said thermoplastic polymer or the highest melting point of the thermoplastic polymers, and with a shear rate of the blend in the dispersion zone that is greater than or equal to $10^3$ $s^{-1}$.

19. Process according to one of claims 13, wherein the blend formed of granules that is obtained at the outlet of said extruder is subjected to a heat treatment for several hours at a temperature between 100° C. and 150° C., to improve the mechanical properties of this blend, such as the tensile strength, tear strength and compression set.

* * * * *